3,444,037
WATER RESISTANT POLYVINYL ACETATE ADHESIVE COMPOSITIONS
Walter B. Armour, Plainfield, N.J., assignor to National Starch and Chemical Corporation, New York, N.Y., a corporation of Delaware
No Drawing. Filed June 8, 1965, Ser. No. 462,393
Int. Cl. B32b 27/04, 27/06
U.S. Cl. 161—198                                11 Claims

ABSTRACT OF THE DISCLOSURE

An adhesive composition capable of yielding dry films characterized by their optimum water resistance; said composition comprising a mixture of a vinyl acetate polymer emulsion, a sulfonated B-stage phenolic resin and an acidic, metal salt curing agent.

---

This invention relates to the preparation of novel, water resistant, rapid setting adhesive compositions and to the adhesives thus prepared.

It is the object of this invention to provide stable, thermosetting aqueous vinyl acetate polymer emulsion compositions capable of yielding adhesive bonds which exhibit optimum water resistance and high strength. A further object of this invention involves the preparation of adhesives which are characterized by their ability to rapidly set at ambient or elevated temperatures and which are, thus, suitable for diverse applications. Other objects will become apparent from the following description.

As is known in the art, modern adhesives are prepared from a wide variety of synthetic organic resins, many of which are often blended so as to provide adhesive compositions displaying specific properties desired by the practitioner. Most adhesives are ordinarily classified as being either thermoplastic or thermosetting. Thus, thermosetting adhesives are formulated with resins which, by means of a chemical reaction, solidify or set on heating and cannot be softened on further heating. Thermoplastic adhesives, on the other hand, are made with resins which may be softened by heat, and thereupon regain their original properties upon cooling.

Among the resins which are used for the preparation of exterior grade, water resistant, thermosetting adhesives, one may list resorcinol-formaldehyde, melamine-formaldehyde and phenol-formaldehyde resins. One of the major disadvantages of the thermosetting adhesives derived from such resins is that they require hot pressing or extended pressing at ambient temperatures. Thus, melamine-formaldehyde and phenol-formaldehyde adhesives require pressing at temperature above 200° F. and, although resorcinol adhesives cure at temperatures as low as 75° F., they require press times in excess of eight hours. Their other general disadvantages include reduced storage stability, shortened pot life, and the formation of colored glue lines.

Aqueous emulsions of polyvinyl acetate are widely used as adhesives. Often such emulsions can be used with little, if any, modification. Usually, however, it is necessary to alter either their physical properties and/or their application characteristics. Thus, various modifiers may be included in order to increase viscosity and setting speeds, to improve machinability and remoistenability, and to provide colorless glue lines, etc. Despite this potential for improvement, the adhesive bonds derived from conventional polyvinyl acetate emulsions are still inherently poor with respect to their water resistance. Thus, this property, which is required in adhesive bonds which are to be exposed to moisture in ordinary usage or which may be exposed to the excessive moisture and varying temperature conditions encountered during outdoor exposure, has been generally inadequate in the polyvinyl acetate emulsion adhesives heretofore available.

It has been shown that adhesives having the ability to set rapidly at room temperature and to develop some degree of water resistance can be obtained by blending an A-stage phenolic resin with an aqueous emulsion of polyvinyl acetate. These A-stage phenolics are intermediates in phenol-formaldehyde condensation reactions. Thus, when such condensation reactions are conducted in the presence of alkaline catalysts, phenol alcohols are initially formed which are capable of polymerizing into high molecular weight molecules containing an appreciable number of methylol groups; each methylol group representing a potential crosslink site. Thus, if the reaction is terminated in its early stages, comparatively short, linear, functional molecules, that are fusible and soluble in both water and conventional solvents, will be produced. The latter condensates are known as resoles or A-stage phenolic resins. If the polymerization is allowed to continue, higher molecular weight resins at the B or resitole stage are produced, which are still fusible and soluble in conventional organic solvents, such as acetone, but which are no longer soluble in water or alkali solutions. Allowing the latter reaction to run its full course results in extensively crosslinked, fully cured, insoluble, infusible resites or C-stage phenolic resins.

Thus, one can see that A-stage phenolic resins are often chosen for use as additives for polyvinyl acetate emulsion adhesives because of their high water solubility and resultant compatibility with the polyvinyl acetate aqueous emulsions as well as for their potential crosslinking ability. Despite these advantages, however, the high water solubility and the low molecular weight of the A-stage phenolic resins are, in fact, decided disadvantages with regard to the degree of water resistance of the resulting adhesives, especially where a high ratio of A-stage phenolic resin to polyvinyl acetate resin solids is used and/or where room temperature curing conditions are to be utilized.

B-stage phenolic resins, although tougher, higher in molecular weight, and inherently less water sensitive than the A-stage phenolics, have not, heretofore, been utilized for the purpose of increasing the water resistance of polyvinyl acetate emulsion adhesives because of their high degree of incompatibility with such emulsions. This incompatibility is due to the inherent water insolubility of the B-stage phenolics. Although stable B-stage phenolic resin solutions may be prepared using a variety of organic solvents, either alone or in conjunction with water, when such solutions are admixed with aqueous polyvinyl acetate emulsions, the usual result is the coagulation of such polyvinyl acetate emulsions.

The present invention surprisingly provides smooth, stable, water resistant adhesive compositions comprising the combination of aqueous vinyl acetate homo- or copolymer emulsions, sulfonated B-stage phenolic resins, and acidic, metal salt curing agents. Thus, it has been found that B-stage phenolic resins are compatible with vinyl acetate polymer emulsions if the latter resins have been sulfonated to within prescribed limits which are dependent upon the molecular weight of the particular phenolic resin. Thus, a lower molecular weight B-stage phenolic resin, having a molecular weight in the range of from about 500 to 1,000, will require only from about 1 to 5% sulfonation, as based on the total weight of the B-stage phenolic resin, whereas the higher molecular weight B-stage phenolic resins, having a molecular weight in the range of from about 1,000 to 5,000, may require up to 30% sulfonation, as based on the total weight of B-stage phenolic resin, in order to attain compatibility with the aqueous emulsions.

The use in this disclosure of the term "percent sulfonation" is meant to indicate the percent, by weight, of the resin which comprises sulfonate, i.e.

groups.

A practical means for determining the minimum degree of sulfonation required by any particular B-stage phenolic resin in order to provide a compatible system upon being admixed with an aqueous vinyl acetate polymer emulsion, is to determine the resin's dilutability with water. The latter procedure comprises preparing an aqueous solution containing 40%, by weight, of sulfonated B-stage phenolic resin solids, adjusting the pH level of the resulting solution to from about 7.5 to 8.5 by the addition, thereto, of appropriate amounts of an aqueous alkali solution, adding additional amounts of water to the solution, and thereupon, determining the point at which precipitation of the resin solids first occurs. Adequate sulfonation is indicated, for purposes of this invention, when the aqueous solution containing 40%, by weight, of sulfonated B-stage phenolic resin solids tolerates the addition of water in a volume at least equal to its original volume without causing the resin solids to precipitate out of solution.

The presence of the acidic, metal salt curing agents in the adhesive compositions of this invention has also been shown to be effective in decreasing the water sensitivity of the adhesives derived therefrom. Thus, while aqueous vinyl acetate polymer emulsions ordinarily show poor water resistance, the adhesives resulting from the products of this invention are found, in contrast, to surprisingly retain their excellent adhesive properties and physical structure even after prolonged exposure to moisture.

In addition, the adhesive products of this invention yield tacky films which do not require the application of excessive pressure for their successful bonding to a wide variety of solid substrates.

The novel adhesive compositions of this invention are thus seen to overcome all of the deficiencies found in the previously described polyvinyl acetate emulsion systems. Therefore, it is now possible for the practitioner to rapidly effect the lamination of various substrates at ambient temperatures while, nonetheless, developing an outstanding degree of water resistance in the resulting adhesive bonds.

Regarding the polymers of vinyl acetate which may be used in the process of this invention, these may include polyvinyl acetate or copolymers of vinyl acetate with at least one other polymerizable monomer selected from the group consisting of (1) alkyl esters of acrylic and methacrylic acid such as methyl acrylate, methyl methacrylate, ethyl acrylate, ethyl methacrylate, etc.; (2) substituted or unsubstituted mono or dialkyl esters of alpha, beta-unsaturated dicarboxylic acids such as the substituted or unsubstituted mono and dibutyl, mono and diethyl maleate esters as well as the corresponding fumarates, itaconates, and citraconates; (3) alpha, beta-unsaturated carboxylic acids such as crotonic, acrylic, methacrylic, maleic, itaconic, and citraconic acids; (4) vinyl halides such as vinyl chloride; (5) vinylidene halides such as vinylidene chloride; and, (6) amides of alpha, beta-unsaturated carboxylic acids and their N-alkylol derivatives such as acrylamide and N-methylol acrylamide. It is preferred that the total comonomer concentration should not exceed about 20%, by weight of the resulting copolymer. Thus, the weight ratio of vinyl acetate to comonomer range from about 80:20 to 20 to 100:0.

The vinyl acetate homo- or copolymer emulsions may be prepared by any of the aqueous emulsion polymerization techniques well known to those skilled in the art. These techniques generally involve the emulsion polymerization of the respective monomers in the presence of a free radical type catalyst. The reaction is usually conducted under agitation at temperatures in the range of from 60 to 80° C. In most cases, the reaction will require from 3 to 6 hours, with the exact time depending on the particular catalyst and the concentration in which it is used, as well as the particular polymerization technique which is employed.

The emulsifying agent which is preferred for use in preparing the vinyl acetate homo- or copolymers emulsions applicable for use in this invention is polyvinyl alcohol. The latter is usually present in the initial monomer charge in concentrations ranging from about 2 to 15%, as based on the weight of the monomer charge. The resulting vinyl acetate polymer emulsions may contain any total resin solids content which may be desired by the practitioner although the practical total resin solids range is from about 40 to 60%, by weight.

The sulfonated B-stage phenolic resins may be prepared by means of any of the standard sulfonation techniques well known to those skilled in the art. Thus, for example, U.S. Patent No. 2,357,798 discloses a method for the preparation of sulfonated phenolic resins which comprises condensing a phenol compound with formaldehyde and reacting the resulting methylol phenol with an inorganic sulfite such as sodium sulfite. In addition, the method taught by U.S. Patent No. 2,230,641, wherein sulfonated phenolic resins are prepared by condensing phenol sulfonates with formaldehyde, may also be utilized. In either event for purposes of this invention, the phenol component of these resins may either be an unsubstituted phenol or an alkyl or alkylene substituted phenol. Thus, the phenol component may correspond to the formula

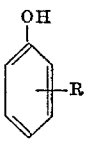

wherein R is a radical selected from the group consisting of hydrogen radicals, alkyl radicals having the structure $C_nH_{2n+1}$, and alkylene radicals having the structure $C_nH_{2n-1}$; and, wherein $n$ in each of the latter cases is an integer having a value of from 1 to 6 inclusive.

The sulfonated B-stage phenolic resins are utilized in aqueous solutions and are adjusted to the requisite pH level of from about 7.5 to 8.5 by the addition thereto of aqueous solutions of alkali metal hydroxides, such as sodium hydroxide and potassium hydroxide. The total solids content of these phenolic resin solutions may range from about 30 to 60%, by weight.

In preparing the adhesive compositions of this invention, it is merely necessary first to combine, by mixing, the aqueous vinyl acetate homo- or copolymer emulsions with the sulfonated B-stage phenolic resin solutions. No heating or other special treatment is required for this operation. The resulting formulations are found to be extremely stable and may be stored for prolonged periods with no danger of any premature curing or other spoilage.

With regard to proportions, the adhesive compositions of this invention may contain from about 5 to 70% of sulfonated B-stage phenolic resin solids and from about 30 to 95% of vinyl acetate homo- or copolymer solids, all based on the total weight of solids in the adhesive composition. Compositions containing less than 5%, by weight, of sulfonated B-stage phenolic resin solids show inadequate water resistance, while the compositions exceeding 70%, by weight, of these phenolics display a marked decrease in their rapid setting characteristics. Optimum results have been obtained with adhesive compositions containing approximately 40%, by weight, of sulfonated B-stage phenolic resin solids and approximately 60%, by weight, of vinyl acetate homo- or copolymer solids.

The addition of acidic, metal salt curing agents is employed in order to accelerate the cure of the vinyl acetate polymer emulsion-sulfonated B-stage phenolic resin combination. Thus, these curing agents facilitate the curing or crosslinking of the adhesive coatings or films derived from the adhesive compositions of this invention, thereby enhancing their water resistance.

The preferred curing agents for use in the process of this invention comprise acidic, metal salts selected from the group consisting of chromic nitrate, chromic perchlorate, aluminum nitrate, and aluminum chloride. These curing agents may be added to the adhesives of this invention at the time the latter formulations are to be utilized, or, if added earlier, they should be introduced no sooner than about 48 hours prior to such utilization. The use of these acidic, metal salts aids in instilling water resistance to a far greater degree than is possible with the use of the corresponding free acids.

The proportion of acidic, metal salt curing agent which is added will depend upon the rate of cure which is desired in the final product but a practical range has been

EXAMPLE I

This example illustrates the preparation of a number of different adhesive formulations typical of this invention.

The procedure utilized in preparing these formulations involved the polymerization of vinyl acetate homo- or copolymer emulsions using, as an emulsifier for the respective polymerization procedures, 6%, by weight of the monomer charge, of an 88% hydrolyzed, medium viscosity polyvinyl alcohol. The sulfonated B-stage phenolic resin, which was then added to the emulsion, was in the form of an alkaline, aqueous solution at a pH level of 8.5, containing 40%, by weight, of resin solids. The selected curing agent, in the form of an aqueous solution, was added to the polymer emulsion-phenolic resin blend just prior to its use as an adhesive. The following table presents complete data for the formulations which were produced.

| | Vinyl acetate polymer emulsion | | | Sulfonated B-stage phenolic resin | | | |
|---|---|---|---|---|---|---|---|
| Nature of vinyl acetate polymer | Ratio of ViOAc: comonomer | Percent by wt. resin solid | Total grams polymer emulsion in formulation | Percent by wt. sulfonate groups | Gram resin solids | Curing agent | Gram equivalents curing agent per 100 grams total blend |
| Homopolymer | | 53 | 100 | 12 | 50 | Al(NO$_3$)$_3$ | 0.07 |
| Copolymer with ethyl acrylate | 97:3 | 50 | 100 | 5 | 3 | Al(NO$_3$)$_3$ | 0.04 |
| Copolymer with ethyl acid maleate | 96:4 | 50 | 100 | 1 | 20 | Cr(NO$_3$)$_3$ | 0.06 |
| Copolymer with acrylic acid | 98:2 | 50 | 100 | 10 | 15 | AlCl$_3$ | 0.05 |
| Copolymer with dibutyl fumarate | 85:15 | 50 | 100 | 18 | 25 | Cr(ClO$_4$)$_3$ | 0.03 |
| Copolymer with acrylamide | 94:6 | 50 | 100 | 30 | 100 | Cr(NO$_3$)$_3$ | 0.02 |
| Terpolymer with dibutyl fumarate and acrylic acid. | 80:18:2 | 50 | 100 | 15 | 10 | Cr(NO$_3$)$_3$ | 0.04 | found to be from about 0.02 to 0.07 gram equivalents of curing agent (anhydrous basis) for each 100 grams of the total weight of the blend of the vinyl acetate emulsion and the sulfonated B-stage phenolic resin solution.

Our adhesives may be used in the bonding, saturation or lamination of many types of porous substrates, such as wood, tempered hardboard, textiles, leather, paper, cement asbestos board and related products, as well as for the manufacture of such products as plywood and wood particle board. One application for which our adhesives have proven to be particularly useful is for the bonding of so-called "finger joints." These finger points are employed in the lumber industry where it is desirable to make use of the smaller sections of wood that would normally be impractical to use. This can now be accomplished by joining these smaller sections with adhesives and a common procedure for this purpose involves the cutting of the mating edges of the lumber into interlocking, mating fingers which are subsequently glued together.

Another interesting application for our adhesives involves their use in the construction of laminated beams for arches and other supporting structures wherein lumber is laminated so as to obtain the desired dimensions of the final beam. Our adhesives may also be used in the construction of so-called "curtain wall panels." These panels comprise prefabricated wall panels which are made by binding skin materials such as metals, cardboard, plywood, glass and asbestos board, etc. to cores such as foamed plastics, honeycomb cores, insulation board and particle board, etc.

When adhering substrates coated with our compositions, wet combining methods are used. The freshly coated substrates may be adhered at room temperature, under pressures of from 30–300 p.s.i. which are applied for periods of from ½–3 hours. By increasing the temperature, both the pressure and the press time will, of course, be reduced proportionately.

The following examples will further illustrate the embodiment of this invention. In these examples all parts given are by weight unless otherwise noted.

Each of the above described formulations was successfully employed as an adhesive for the bonding of a wide variety of wood, plastic and metal substrates. The resulting adhesive bonds were superior with regard to such factors as static loading and heat resistance of the cured films. This superiority was especially noted in the water resistance exhibited by the cured films derived from the adhesive systems of this invention.

EXAMPLE II

This example illustrates the high quality adhesive bonds derived from the adhesive compositions of this invention when compared with conventional thermosetting adhesives.

The polyvinyl acetate emulsion utilized in several compositions of this example contained 53%, by weight, resin solids and was prepared using 3%, by weight of the monomer charge, of an 88% hydrolyzed, medium viscosity polyvinyl alcohol as the emulsifying agent.

The aqueous sulfonated B-stage phenolic resin solution used in the compositions of this example contained 40%, by weight, resin solids. The pH level of the solution was 8.0. The sulfonated B-stage phenolic resin, which contained 12%, by weight, of sulfonate groups, was in the form of a sodium sulfonate salt.

Various formulations comprising the above described polyvinyl acetate emulsion and the sulfonated B-stage phenolic resin solution were used to adhere plywood veneers. Also, samples of conventional thermosetting adhesives containing commercial catalysts were tested for comparison with the new systems of this invention. Thus, the various adhesive formulations were applied in a 6 mil wet film to one surface of a number of ⅟₁₆″ thick brichwood veneers. An uncoated piece of veneer was then placed between two of the coated veneers so as to effect a 3 ply panel. The 3 veneers were then compressed under a pressure of 75 p.s.i. and a temperature of 75° F. for 45 minutes. At the end of this press cycle, the laminations were examined to determine the degree of bond development.

The various adhesive formulations employed in the aforedescribed procedure are set forth in the following table. The total weight of the respective polymer emulsions, of the commercial thermosetting adhesives, and of the sulfonated B-stage phenolic resin solutions are presented in grams, while the concentrations of the curing agents are presented in gram equivalents per 100 grams of the total weight of the blend of polyvinyl acetate emulsion and sulfonated B-stage phenolic resin solution.

The various formulations comprising these vinyl acetate polymer emulsions in combination with either the sulfonated B-stage phenolic resin solutions or an unsulfonated B-stage phenolic resin solution or an A-stage phenolic resin solution, some of these formulations also containing other components such as aqueous curing agent solutions, etc., were used to adhere plywood veneers. Thus, the various adhesive formulations were applied, in a 6 mil wet film, to one surface of a number of 1/16" thick birchwood veneers. Three of these veneers were then

| Components | Formulation Number | | | | | | | |
|---|---|---|---|---|---|---|---|---|
| | 1 | 2 | 3 | 4 | 5 | 6 | 7 | 8 |
| Polyvinyl acetate emulsion (as described hereinabove) | 100 | 100 | 100 | 100 | | | | |
| Sulfonated B-stage phenolic resin solution (as described hereinabove) | 7 | 100 | 50 | 300 | | | | |
| Resorcinol-formaldehyde resin | | | | | 100 | | | |
| Phenol-formaldehyde resin | | | | | | 100 | | |
| Melamine-formaldehyde resin | | | | | | | 100 | |
| Urea-formaldehyde resin | | | | | | | | 100 |
| Chromic nitrate | | | 0.02 | | | | | |
| Chromic perchlorate hexahydrate | | 0.02 | | | | | | |
| Aluminum nitrate | | | | 0.07 | | | | |
| Aluminum chloride | | | | 0.05 | | | | |

The nature of the bonds which were developed in the laminations prepared by utilizing the above described formulations, after a press time of 45 minutes at a temperature of 75° F., are presented in the following table:

Formulation number:     Nature of bond
1 — Firm.
2 — Do.
3 — Do.
4 — Do.
5 — No bond formation.
6 — Do.
7 — Do.
8 — Do.

It can be seen from the results tabulated above that the adhesive compositions of this invention produced adhesive bonds that were vastly superior to the other formulations tested. Thus, the conventional thermosetting adhesives showed no evidence of bond development whereas the compositions of this invention developed firm bonds which could not be easily separated.

EXAMPLE III

This example illustrates the high degree of strength and water resistance exhibited by the bonds derived from the adhesive compositions of this invention when compared with: (1) commercial thermosetting adhesives; (2) blends of vinyl acetate polymer emulsions with A-stage phenolic resin; and, (3) blends of vinyl acetate polymer emulsions with unsulfonated B-stage phenolic resin.

The vinyl acetate polymer emulsions utilized in the compositions of this example are presented in the following table:

| Emulsion Number | Nature of vinyl acetate copolymer | Ratio of ViOAc to comonomer | Percent by wt. resin solids | Polyvinyl alcohol percent by wt. of the monomer charge |
|---|---|---|---|---|
| 1 | Homopolymer | | 55 | 3 |
| 2 | do | | 45 | 15 |
| 3 | Copolymer with ethyl acid maleate | 97:3 | 50 | 6 |
| 4 | Copolymer with N-methylol acrylamid. | 95:5 | 50 | 8 |

The aqueous sulfonated B-stage phenolic resin solutions utilized in the compositions of this example are presented in the following table:

| Solution Number | Percent by wt. sulfonate groups in B-stage phenolic resin | Percent by wt. resin solids in solution | Adjusted pH level | Alkali additive |
|---|---|---|---|---|
| 1 | 25 | 40 | 7.5 | NaOH |
| 2 | 15 | 40 | 8.5 | NaOH |
| 3 | 18 | 50 | 8.0 | KOH | compressed for 45 minutes under a pressure of 75 p.s.i. and temperature of 75° F. so as to result in the formation of a three ply panel. These specimens were then aged at 75° F. for 10 days prior to their being subjected to the tests described below.

The above prepared 3 ply panels were cut into 1" x 3¼" x 3/16" specimens. A number of these specimens were then immersed in boiling water for four hours whereupon they were placed in a drying oven set at a temperature of 145° F. for a period of 20 hours. They were then immersed in boiling water for an additional four hours after which the water was cooled to 72° F. by the addition of cold water. While still wet, the tensile shear strength, in p.s.i., of the adhesive bonds of these plywood test specimens was determined using an Instron Tensile Tester at a rate of shear of 0.2 inch per minute. Following the tensile shear strength determinations, the test specimens were examined so as to determine their percent of wood failure. The percent of wood failure indicates what percentage of the total area of the wood surface, at the interface with the adhesive film, was torn while being subjected to the tensile shear determinations. Thus, a high percentage of wood failure indicates a strong adhesive bond since the wood, rather than the adhesive bond, has been torn. The above described test procedure conforms to the cyclic boil test for Type I hardwood plywood as established by the U.S. Department of Commerce Commerical Standard CS35-56 which is used to evaluate commercial grades of hardwood plywood and is also used in setting up adhesive requirements for applications other than plywood, i.e., curtain wall panels, finger joints, and laminated beams, etc. The standards established for this test set up the following scale for comparing the percent wood failure for a specific range of tensile shear strengths.

| Tensile shear strength (p.s.i.) | Minimum percent wood failure | Average percent wood failure |
|---|---|---|
| Under 250 | 25 | 50 |
| 250-350 | 10 | 30 |
| Above 350 | 10 | 15 |

In addition to the aforementioned test procedures, a cold water soak test was run on a replicate set of 1" x 6" splints wherein the splints were soaked in water at 72° F.

For a period of 48 hours and then tested with an Instron Tensile Tester while still wet. This procedure conforms with Federal Test Method Standard No. 175, entitled "Adhesives: Methods of Testing," Method 2031, Procedure 4.1. There is no minimum established by this method, and it is used only to evaluate the level of improvements obtained with the new formulations.

The various adhesive formulations employed in the aforedescribed procedures are set forth in the following table. The total weight of the respective vinyl acetate polymer emulsions, sulfonated B-stage phenolic resin solutions, and unsulfonated A and B-stage phenolic resin solutions are presented in grams, while the concentrations of the curing agents are presented in gram equivalents per 100 grams of the total weight of the blend of vinyl acetate polymer emulsion and the phenolic resin solution.

| Components | Formulation Number | | | | | | | | |
|---|---|---|---|---|---|---|---|---|---|
| | 9 | 10 | 11 | 12 | 13 | 14 | 15 | 16 | 17 |
| Emulsion number 1 (as described hereinabove) | 100 | | | | | | | | 100 |
| Emulsion number 2 (as described hereinabove) | | 100 | | | | | | | |
| Emulsion number 3 (as described hereinabove) | | | 100 | | | | | | |
| Emulsion number 4 (as described hereinabove) | | | | 100 | 100 | 100 | 100 | 100 | |
| Solution number 1 (as described hereinabove) | 40 | | | 40 | 7 | 10 | 40 | | |
| Solution number 2 (as described hereinabove) | | 60 | | | | | | | |
| Solution number 3 (as described hereinabove) | | | 30 | | | | | | |
| A-stage phenolic resin solids (in aqueous solution containing 50%, by wt. resin solids) | | | | | | | | 40 | |
| Unsulfonated B-stage phenolic resin solids (in isopropanol solution containing 50% by wt., resin solids) | | | | | | | | | 40 |
| Chromic nitrate | 0.02 | 0.07 | 0.04 | 0.04 | | | | | |
| Chromic perchlorate hexahydrate | | | | | 0.05 | | | | |
| Aluminum nitrate | | | | | | 0.04 | | | |
| Aluminum chloride | | | | | | | 0.06 | | |

The results obtained by employing the above described formulations as well as the formulations described in Example II, hereinabove, in the test procedures heretofore described, are set forth in the following table:

| | Boil Test | | Cold Soak Test | |
|---|---|---|---|---|
| Formulation Number | Average, p.s.i. | Average percent wood tear | Average, p.s.i. | Average percent wood tear |
| 1 | 330 | 20 | 310 | 0 |
| 2 | 315 | 33 | 290 | 0 |
| 3 | 325 | 35 | 320 | 20 |
| 4 | 350 | 60 | 380 | 36 |
| 5 | | | No bond | |
| 6 | | | No bond | |
| 7 | | | No bond | |
| 8 | | | No bond | |
| 9 | 336 | 15 | 264 | 0 |
| 10 | 310 | 20 | 300 | 0 |
| 11 | 360 | 75 | 320 | 10 |
| 12 | 345 | 65 | 350 | 20 |
| 13 | 355 | 45 | 305 | 10 |
| 14 | 305 | 25 | 290 | 0 |
| 15 | 310 | 70 | 315 | 25 |
| 16 | 250 | 0 | 210 | 0 |
| 17 | | | | |

[1] Could not be tested—polyvinyl acetate emulsion coagulated on addition of the B-stage phenolic resin solution.

It can be readily seen from the results noted in the above table that the adhesive compositions of this invention produced adhesive bonds that were vastly superior in water resistance and in shear strength to the other formulations tested.

Summarizing, this invention is thus seen to provide novel, rapid setting adhesive compositions capable of yielding bonds exhibiting optimum water resistance and high strength and suitable for exterior applications without requiring high temperature curing. By "optimum water resistance," as used herein and in the claims hereof, is meant a degree of water resistance on the part of the adhesive bonded laminate such that when it is immersed in water, the laminate will not exhibit any ply or laminae separation but will, rather yield a bond strength and a substrate tear substantially in excess of commercial standards when an attempt is made to effect its delamination.

Variations may, of course, be made in procedures, proportions, and materials without departing from the scope of this invention which is limited only by the following claims.

I claim:
1. The method for making an adhesive composition capable of yielding dry films characterized by their optimum water resistance, said method consisting of the steps of: (a) sulfonating a fusible B-stage phenolic resin, which is soluble in acetone but insoluble in water and in aqueous solutions and wherein the phenol component of said sulfonated B-stage phenolic resin corresponds to the formula:

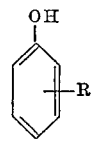

wherein R is a radical selected from the group consisting of hydrogen radicals, alkyl radicals having the structure $C_nH_{2n+1}$, and alkylene radicals having the structure $C_nH_{2n-1}$, wherein $n$ in each of the two latter groups of radicals is an integer having a value of from 1 to 6 inclusive; so as to render an aqueous solution of the thus sulfonated B-stage phenolic resin compatible with aqueous vinyl acetate polymer emulsions; an adequate degree of sulfonation on the part of the B-stage phenolic resin being indicated when an aqueous solution, at a pH of 7.5–8.5, containing 40%, by weight, of resin solids of said sulfonated B-stage phenolic resin tolerates the addition of water in an amount at least equal to its original volume without causing the resin solids to precipitate out of the soluton; and, (b) admixing an aqueous solution of the thus sulfonated B-stage phenolic resin with an aqueous vinyl acetate polymer emulsion; wherein said sulfonated B-stage phenolic resin is present in a concentration of from about 5 to 70% of resin solids, as based on the total weight of resin solids in the adhesive composition.

2. The method of claim 1, wherein said vinyl acetate polymer is selected from the group consisting of polyvinyl acetate and copolymers containing at least about 80%, by weight, of vinyl acetate with at least one other polymerizable comonomer selected from the group consisting of alkyl esters of acrylic acid, alkyl esters of methacrylic alkyl esters, beta-unsaturated dicarboxylic acids, monoalkyl esters of alpha, beta-unsaturated dicarboxylic acids, dialkyl esters of alpha, beta-unsaturated dicarboxylic acids, alpha, beta-unsaturated carboxylic acids, vinyl halides, vinylidiene halides, amides of alpha, beta-unsaturated carboxylic acids, and N-alkylol derivatives of amides of alpha, beta-unsaturated carboxylic acids.

3. The method of claim 1, wherein said aqueous sulfonated B-stage phenolic resin solution is at a pH level of from about 7.5 to 8.5.

4. The method of claim 1, wherein the final product resulting from steps (a) and (b) is admixed with an acidic, metal salt curing agent selected from the group consisting of chromic nitrate, chromic perchlorate, aluminum nitrate, and aluminum chloride.

5. The method of claim 4, wherein said acidic, metal salt curing agent is present in a concentration of from about 0.02 to 0.07 gram equivalents per each 100 grams of the total weight of the adhesive composition.

6. An adhesive composition prepared in accordance with the method of claim 1.

7. An adhevise composition prepared in accordance with the method of claim 4.

8. An adhesive composition capable of yielding dry films which are characterized by their optimum water resistance, said adhesive comprising a mixture of (a) an aqueous vinyl acetate polymer emulsion wherein said vinyl acetate polymer is selected from the group conststing of polyvinyl acetate and copolymers containing at least about 80%, by weight, of vinyl acetate with at least one other polymerizable comonomer selected from the group consisting of alkyl esters of acrylic acid, alkyl esters of methacrylic acid, alpha, beta-unsaturated dicarboxylic acids, mono-alkyl esters of alpha, beta-unsaturated dicarboxylic acids, dialkyl esters of alpha, beta-unsaturated dicarboxylic acids, alpha, beta-unsaturated carboxylic acids, vinyl halides, vinylidene halides, amides of alpha, beta-unsaturated carboxylic acids, and N-alkylol devivatives of amides of alpha, beta-unsaurated carboxylic acids; (b) fusible sulfonated B-stage phenolic resin, which is soluble in acetone but insoluble in water and in aqueous alkali solutions and wherein the phenol component of said sulfonated B-stage phenolic resin corresponds to the formula:

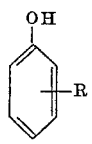

wherein R is a radical selected from the group consisting of hydrogen radicals, alkyl radicals having the structure $C_nH_{2n+1}$, and alkylene radicals having the structure $C_nH_{2n-1}$, wherein $n$ in each of the two latter groups of radicals is an integer having a value of from 1 to 6 inclusive; an adequate degree of sulfonation on the part of the B-stage phenolic resin being indicated when an aqueous solution, at a pH of 7.5–8.5, containing 40%, by weight, of resin solids of said sulfonated B-stage phenolic resin tolerates the addition of water in an amount at least equal to its original volume without causing the resin solids to precipitate out of the solution; and (c) an acidic, metal salt curing agent selected from the group consisting of chromic nitrate, chromic perchlorate, aluminum nitrate, and aluminum chloride; wherein said sulfonated B-stage phenolic resin is present in a concentration of from about 5 to 70% of resin solids, as based on the total weight of resin solids in the adhesive composition.

9. The adhesive composition of claim 8, wherein said acidic, metal salt curing agent is present in a concentration of from about 0.02 to 0.07 gram equivalents per each 100 grams of the total weight of said adhesive composition.

10. A solid substrate coated with a dried adhesive film exhibiting optimum water resistance, said film being deposited from an aqueous adhesive composition comprising a mixture of (a) an aqueous vinyl acetate polymer emulsion wherein said vinyl acetate polymer is selected from the group consisting of polyvinyl acetate and copolymers containing at least about 80%, by weight, of vinyl acetate with at least one other polymerizable comonomer selected from the group consisting of alkyl esters of acrylic acid, alkyl esters of methacrylic acid, alpha, beta-unsaturated dicarboxylic acids, mono-alkyl esters of alpha, beta-unsaturated dicarboxylic acids, dialkyl esters of alpha, beta-unsaturated dicarboxylic acids, alpha, beta-unsaturated carboxylic acids, vinyl halides, vinylidene halides, amides of alpha, beta-unsaturated carboxylic acids, and N-alkylol derivatives of amides of alpha, beta-unsaturated carboxylic acids; (b) a fusible sulfonated B-stage phenolic resin which is soluble in acetone but insoluble in water and in aqueous alkali solutions and wherein the phenol component of said sulfonated B-stage phenolic resin corresponds to the formula:

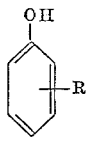

wherein R is a radical selected from the group consisting of hydrogen radicals, alkyl radicals having the structure $C_nH_{2n+1}$, and alkylene radicals having the structure $C_nH_{2n-1}$, wherein $n$ in each of the two latter groups of radicals is an integer having a value of from 1 to 6 inclusive; an adequate degree of sulfonation on the part of the B-stage phenolic resin being indicated when an aqueous solution, at a pH of 7.5–8.5, containing 40% by weight, of resin solids of said sulfonated B-stage phenolic resin tolerates the addition of water in an amount at least equal to its original volume without causing the resin solids to precipitate out of the solution; and, (c) an acidic, metal salt curing agent selected from the group consisting of chromic nitrate, chromic perchlorate, aluminum nitrate, and aluminum chloride; wherein said sulfonated B-stage phenolic resin is present in a concentration of from about 5 to 70% of resin solids, as based on the total weight of resin solids in the adhesive composition.

11. A laminate comprising at least two laminae, said laminae being adhesively bonded with a dried adhesive film exhibiting optimum water resistance, said film being deposited from an aqueous adhesive composition comprising a mixture of (a) an aqueous vinyl acetate polymer emulsion wherein said vinyl acetate polymer is selected from the group consisting of polyvinyl acetate and copolymers containing at least about 80%, by weight, of vinyl acetate with at least one other polymerizable copolymer selected from the group consisting of alkyl esters of acrylic acid, alkyl esters of methacrylic acid, alpha, beta-unsaturated dicarboxylic acids, monoalkyl esters of alpha, beta, unsaturated dicarboxylic acids, dialkyl esters of alpha, beta-unsaturated dicarboxylic acids, alpha, beta-unsaturated carboxylic acids, vinyl halides, vinylidene halides, amides of alpha, beta-unsaturated carboxylic acids, and N-alkylol derivatives of amides of alpha, beta-unsaturated carboxylic acids; (b) a fusible sulfonated B-stage phenolic resin which is soluble in acetone but insoluble in water and in aqueous alkali solutions and wherein the phenol component of said sulfonated B-stage phenolic corresponds to the formula:

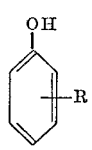

wherein R is a radical selected from the group consisting of hydrogen radicals, alkyl radicals having the structure $C_nH_{2n+1}$, and alkylene radicals having the structure $C_nH_{2n-1}$, wherein $n$ in each of the two later groups of radicals is an integer having a value of from 1 to 6 inclusive; and adequate degree of sulfonation on the part of the B-stage phenolic resin being indicated when an aqueous solution, at a pH of 7.5–8.5, containing 40%, by weight, of resin solids of said sulfonated B-stage phenolic resin tolerates the addition of water in an amount at least equal to its original volume without causing the resin solids to precipitate out of the solution; and, (c) an acidic, metal salt curing agent selected from the group consisting of chromic nitrate, chromic perchlorate, aluminum nitrate, and aluminum chloride; wherein said sulfonated B-stage phenolic resin is present in a concentration of from about 5 to 70% of resin solids, as based on the total weight of resin solids in the adhesive composition.

References Cited

UNITED STATES PATENTS

| | | | |
|---|---|---|---|
| 2,902,459 | 9/1959 | Teppema | 260—29.3 |
| 3,041,301 | 6/1962 | Armour | 260—29.3 |
| 3,108,990 | 10/1963 | Baxter | 260—29.3 |
| 3,274,048 | 9/1966 | Armour et al. | 260—29.3 |
| 3,328,354 | 6/1967 | Dietrick | 260—29.3 |
| 2,357,798 | 9/1944 | Niederhauser et al. | 260—49 |
| 3,219,607 | 11/1965 | Perronin | 260—29.3 |
| 3,221,079 | 11/1965 | Harris | 260—29.3 |

MURRAY TILLMAN, *Primary Examiner.*

JOHN C. BLEUTGE, *Assistant Examiner.*

U.S. Cl. X.R.

161—205, 215, 226, 251, 257, 262, 264; 156—327, 335; 117—148, 161; 260—29.3, 844